(12) United States Patent  (10) Patent No.: US 7,004,584 B1
Meyers et al.  (45) Date of Patent: Feb. 28, 2006

(54) CONTACT LENS AND METHODS OF MANUFACTURE

(75) Inventors: William E. Meyers, Scottsdale, AZ (US); Jerome A. Legerton, San Diego, CA (US)

(73) Assignee: CRT Technology, Inc., Mesa, AZ (US)

( * ) Notice: Subject to any disclaimer, the term of this patent is extended or adjusted under 35 U.S.C. 154(b) by 279 days.

(21) Appl. No.: 09/679,970

(22) Filed: Oct. 5, 2000

(51) Int. Cl.
*G02C 7/04* (2006.01)

(52) U.S. Cl. .................. 351/160 R; 351/161; 351/177
(58) Field of Classification Search ............ 351/160 R, 351/160 H, 161, 162, 177
See application file for complete search history.

(56) References Cited

U.S. PATENT DOCUMENTS

| | | | |
|---|---|---|---|
| 3,270,099 A | | 8/1966 | Camp |
| 4,704,016 A | * | 11/1987 | de Carle ..................... 351/161 |
| 4,787,732 A | | 11/1988 | Siviglia |
| 4,952,045 A | | 8/1990 | Stoyan |
| 5,106,180 A | * | 4/1992 | Marie et al. ................ 351/161 |
| 5,191,365 A | | 3/1993 | Stoyan |
| 5,349,395 A | | 9/1994 | Stoyan |
| 5,422,687 A | * | 6/1995 | Tanaka et al. ............... 351/161 |
| 5,428,412 A | | 6/1995 | Stoyan |
| 5,695,509 A | | 12/1997 | El Hage |
| 5,963,297 A | | 10/1999 | Reim |
| 6,176,579 B1 | * | 1/2001 | Mandell ..................... 351/177 |
| 6,364,482 B1 | * | 4/2002 | Roffman et al. ........ 351/160 R |

\* cited by examiner

*Primary Examiner*—Scott J. Sugarman
(74) *Attorney, Agent, or Firm*—Hahn Loeser & Parks, LLP

(57) ABSTRACT

The present invention is directed to a contact lens design and methods of manufacturing, fitting and using such lenses. As an example, the contact lens may be designed to be used in an orthokeratology treatment program. The contact lens according to the invention overcomes the deficiencies of the prior art, and provides a design which allows proper fitting of a patient, whether for corrective contact lenses or for use in an orthokeratology treatment program. The ability to properly fit a patient will alleviate, at least to a great degree, corneal abrasions from poorly distributed bearing, corneal warpage from decentered lenses, edema from tight fitting lenses and discomfort. The design allows a great deal of flexibility to the fitter to enhance the functionality of the lens. The lens of the present invention includes a central zone and first annular zone located adjacent to and concentrically around the central zone. The two zones are integral with each other and the radius of curvature of the first annular or connecting zone is greater than that of the central zone. In addition, such a design provides a vast amount of alternative methods of manufacture, and lifts the constraint of requiring the origin of the radius of curvature for the first annular zone curve to reside on the central axis of the central base curve or zone.

17 Claims, 2 Drawing Sheets

CONTACT LENS AND METHODS OF MANUFACTURE

TECHNICAL FIELD

This invention relates to contact lenses and methods of manufacture, as well as orthokeratology methods for reshaping the cornea of an eye to treat visual acuity deficiencies. The invention further relates to methods of designing such lenses.

BACKGROUND OF THE INVENTION

In the treatment of visual acuity deficiencies, correction by means of eyeglasses or contact lenses are used by a large percentage of the population. Such deficiencies include patients having hyperopia or being far-sighted, myopia or near-sighted patients as well as astigmatisms caused by asymmetry of the patient's eye. More recently, to alleviate the burden of wearing eyeglasses and/or contact lenses, surgical techniques have been developed for altering the shape of the patient's cornea in an attempt to correct refractive errors of the eye. Such surgical techniques include photorefractive keratectomy (PRK), LASIK (laser in-situ keratectomy), as well as procedures such as automated lamilar keratectomy (ALK) or others. These procedures are intended to surgically modify the curvature of the cornea to reduce or eliminate visual defects. The popularity of such techniques has increased greatly, but still carries the risk in both the procedure itself as well as post surgical complications.

An alternative to permanent surgical procedures to alter the shape of the cornea include orthokeratology, where a contact lens is applied to the eye to alter the shape or curvature of the cornea by compression of the corneal surface imparted by the lens. The reshaping of the cornea in orthokeratology has been practiced for many years, but typically has required an extensive period of time to reshape the cornea. It is also typical of orthokeratology treatment plans that the lenses used for reshaping of the cornea be custom designed and manufactured, thereby greatly increasing the cost and complicating the general use of such procedures. Further, orthokeratology lenses typically have various deficiencies, particularly relating to properly designing a lens for a particular patient to achieve best results in the treatment process. For correction of myopia, the design of prior orthokeratology lenses have typically included a base curve at the central portion of the lens for imparting reshaping pressure to the cornea. An annular zone adjacent the base curve, having a curvature being steeper (shorter radius) than the curvature of the base curve, is provided to transition to a peripheral curve used to facilitate centering the lens. This design is referred to as a "reverse geometry" contact lens. These curves were designed to have coaxial geometry, with the origin of each curve maintained on a central axis. The reverse geometry is provided to facilitate comfort in wearing the lens, and to promote tear flow and oxygen transmission to the central cornea under the base curve. The use of a first annular zone about the base curve with a steeper curvature allows the lens surface to be brought into a position near the surface of the cornea in this region, from the flatter central base curve. The use of a steeper curvature in the first annular zone creates design problems in matching the base curve and peripheral curve of the lens, to provide desired reshaping as well as tear flow.

Another deficiency of prior ortho-K lenses is found in the complexity of the designs, which exacerbate the fitting problems mentioned previously. In the fitting process, if there is an aspect of the lens design, which is not properly fitted for the desired treatment of the patient's eye, or causes excessive discomfort to the patient, the lens must be redesigned accordingly. Unfortunately, in an attempt to redesign a lens, a practitioner may affect other aspects of the lens due to the interdependency between design features. It would be worthwhile to provide an ortho-K lens having independent features, which could be easily modified if required to attain a proper fit in a simpler and more cost-effective process.

SUMMARY OF THE INVENTION

In accordance with the present invention, a corneal contact lens is disclosed which is useful in changing the radius of curvature and shape of the myopic cornea into the desired configuration necessary for normal vision. The lens of the present invention includes a central zone and first annular zone located adjacent to and concentrically around the central zone. The two zones are integral with each other and the radius of curvature of the first annular or connecting zone is greater than that of the central zone. It was discovered that such a corneal contact lens shape is useful in changing the shape of the myopic cornea to that of a normally shaped cornea. In addition, such a design provides a vast amount of alternative methods of manufacture, and lifts the constraint of requiring the origin of the radius of curvature for the first annular zone curve to reside on the central axis of the central base curve or zone.

As a feature of the present invention, the corneal contact lens may also include one or more peripheral zones, which are located concentrically around and integral with the first annular zone. The peripheral zone has a radius of curvature, which is greater than or equal to the radius of curvature of the central zone. In addition, the various dimensions of the lenses are designed to promote desired changes in the shape of the myopic cornea.

BRIEF DESCRIPTION OF THE DESCRIPTION OF THE DRAWINGS

DETAILED DESCRIPTION OF THE INVENTION

Figure 1:
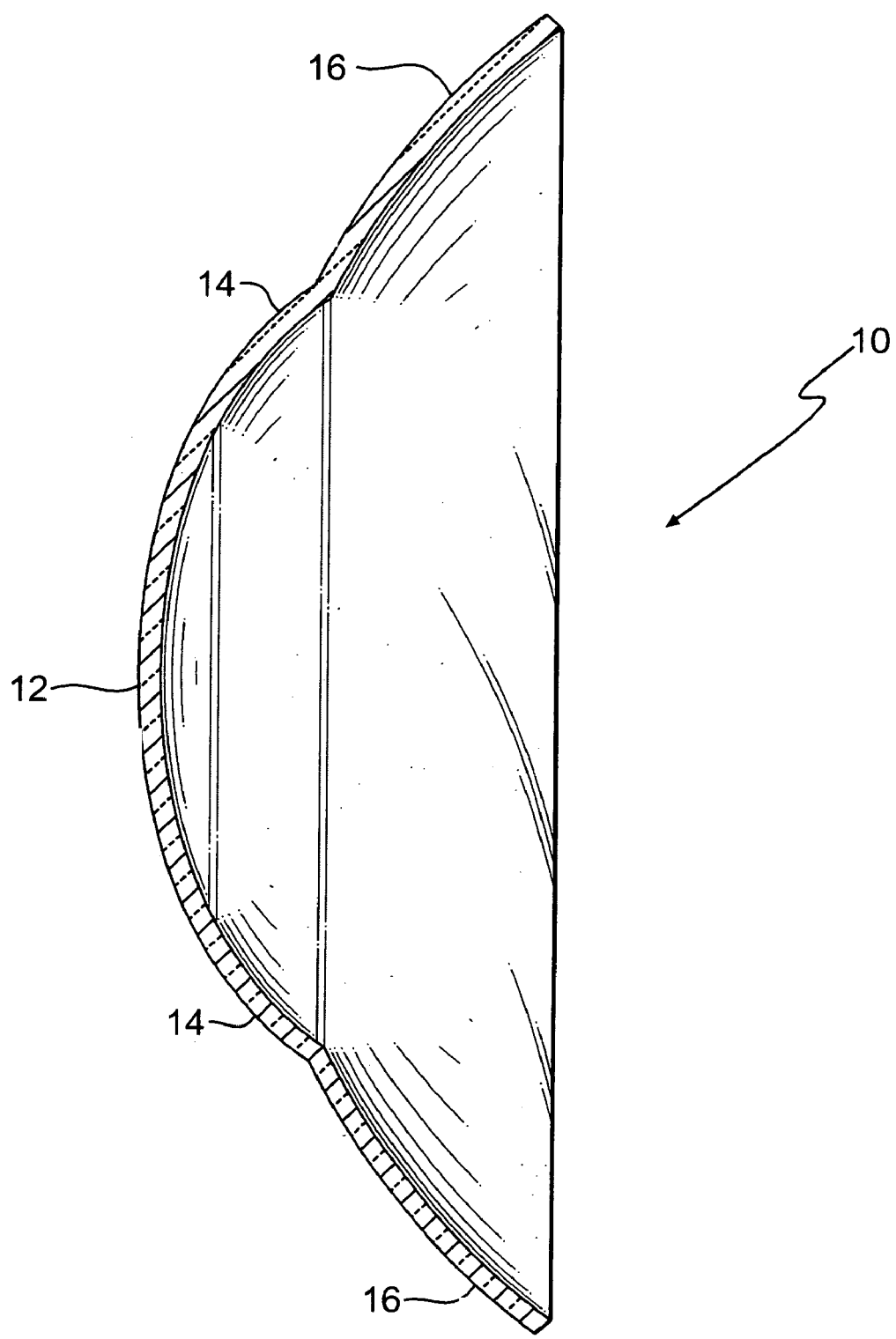
FIG. 1 is a cross-sectional, elevational view of a contact lens depicting the locations of the central zone, first annular zone, and peripheral zone.

A preferred corneal contact lens in accordance with an embodiment of the present invention is shown generally at 10 in FIG. 1. The lens 10 includes a central zone 12, at least a first annular or connecting zone 14, and at least one peripheral zone 16. The overall dimensions of the lens 10 are within the normal ranges for corneal contact lenses. The outside diameter of the lens 10 is typically between 5 to 20 millimeters with other diameters being possible. The lens may have a lateral or cross-sectional thickness of between about 0.05 millimeters to 10 millimeters. Thicknesses in the range of 0.05 to 0.5 millimeters are preferred.

In the example shown in FIG. 1, the surface has a first curvature, which may be spherical and defined as having a radius of curvature. Alternatively, the central zone 12 could be aspherical, toric, or comprised of a combination of annular spherical and/or aspherical zones. In the embodiment shown, the radius of curvature of the central zone 12 may be chosen based upon characteristics of a patients eye for which the lens 10 is being designed, and particularly related to the amount of correction required. The central zone 12 may have a radius of curvature of between about 4 to 20 millimeters. The diameter of the central zone 12 may be between about 2–12 millimeters. Preferred ranges for the radius of curvature and diameter are 7 to 10 millimeters and 4 to 12 millimeters, respectively. The base curve provided on the posterior surface of central zone 12, although shown as spherical, may be aspherical as mentioned above, to impart the desired shape to the cornea for correction of visual defects such as astigmatism or presbyopia. In general, the radius of curvature of the posterior surface of central zone 12 is equivalent to the desired post treatment radius of curvature for the cornea that is undergoing reshaping. Typically, an orthokeratology contact lens is to be fitted such that pressures exerted upon the lens during lens wear are transmitted to the cornea, with the corneal tissue underlying the portion of the lens applying pressure being effectively redistributed in a desired manner. For example, the central zone 12 could be designed to correct myopia or presbyopia by reshaping the cornea, or designed to correct myopia or presbyopia without contacting the cornea, depending again on the characteristics of the patient's eye. The redistribution of corneal tissue causes the cornea to temporarily take on the radius of curvature of the posterior surface of central zone 12 to provide correction of visual defects based upon the present topography of the patient's cornea. The intended effect of the lens 10 may be to sphericize the apical corneal cap and establish a new radius of curvature for it. The central zone 12 may be configured to exert such pressure for reshaping of the cornea.

The first annular zone or connecting zone 14 is integral with and adjacent to the central zone 12 in that the lens 10 may be machined or molded from a single piece of plastic. The first annular zone 14 forms a ring around the central zone 12. The radial thickness of the first annular zone 14 may be between about 0.2 to 10 millimeters. The first annular zone has a second curvature, which also may be spherical and defined by a radius of curvature. The radius of curvature of the first annular zone 14 may be between about 0.1 to 25 millimeters. The preferred ranges are from 0.2 to 5 millimeters for the radial thickness and 7 to 15 millimeters for the radius of curvature. Alternatively, the first annular zone 14 could be aspherical, toric, or comprised of a combination of annular spherical and/or aspherical zones.

The second curvature of the first annular zone 14 is designed to be flatter than the first curvature of the central zone 12. In the embodiment shown, the radius of curvature of the annular zone 14 is greater than the radius of curvature for the central zone 12. The second curvature is preferably not coaxial with the central zone 12. The first annular zone 14, having a flatter curvature, helps position the lens centrally on the cornea and enhances lens wearing comfort. The use of a flatter curvature also allows transitioning between the central zone 12 and peripheral zone 16 in an independent manner, thereby facilitating design of the lens. As the curvature of the annular zone 14 is not coaxial with the curvature of the central zone 12, the curve 14 may be independently designed to meet the edge point of the central zone 12, and also to meet a second point in space, correlating to the desired beginning point of the at least one peripheral curve 16. A designer thus has control over both points of connection between the central zone 12 and peripheral zone 16, allowing more effective and simplified design or redesign activities. The design of the annular zone 14 thus allows a designer to adjust the curvature while connecting at a desired location, to allow adequate tear volume in this region.

Further, the lateral thickness of the first annular zone 14 can be designed to be less than or more than that of the central zone 12. This increases the flexibility of the lens design to achieve desired characteristics.

The at least one peripheral zone 16 is also integral with the central zone 12 and first annular zone 14 in that it is also preferably machined or molded from the same piece of polymer material. More than one peripheral zone 16 may be provided if desired. The peripheral zone 16 may be formed with a third curvature, and could be formed with zero curvature, or could be spherical, aspherical or toric, or comprised of a combination of annular spherical and/or aspherical zones if desired. In the embodiment shown, the peripheral zone 16 is formed as a spherical surface defined by a radius of curvature, which may be between about 4 to 20 millimeters. The radial width of the ring defined by the peripheral zone 16 may be between about 0.2 to 12 millimeters. The preferred ranges are 8 to 15 millimeters for the radius of curvature and 0.5 to 6 millimeters for the radial thickness. The annular zone curvature may also not be coaxial with the curvature of central zone 12. Preferably, the radius of curvature for the peripheral zone 16 will be greater than the radius of curvature for the central zone.

The lens 10 can be made according to any of the known machining or molding processes, which allow variable radii of curvature lenses to be formed. The preferred procedure is to machine the lens from buttons or disks as is commonly known. The materials used in making the lens 10 can be any of the conventional polymers used in oxygen permeable hard, semi-hard and soft hydrogel corneal contact lenses. These materials include a variety of silicone and fluorine substituted acrylates and the soft hydrogel or silicone lens material used in contact lenses. If desired, the three zones 12, 14, and 16 can be made from the same lens material or different lens materials.

Figure 2:
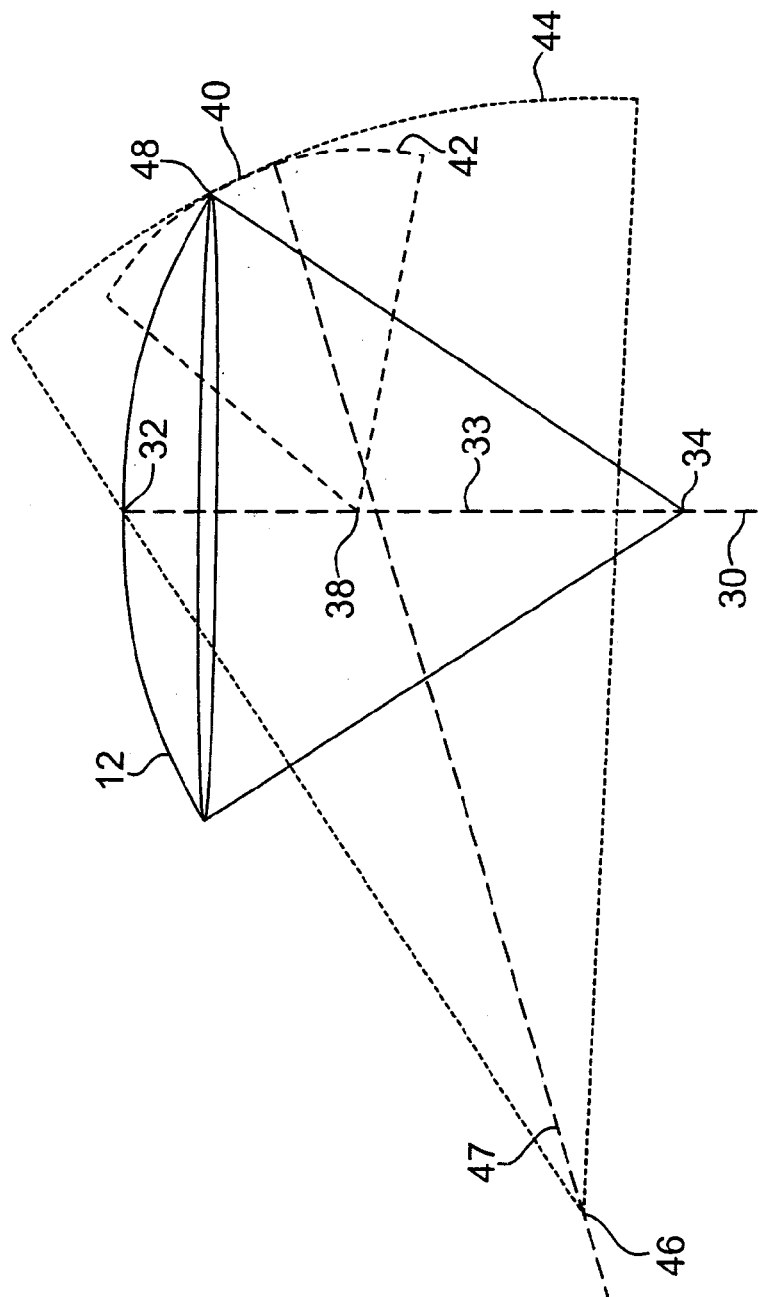
FIG. 2 is an illustration of the curvatures of both the central base curve and the second annular or reverse zone curve associated with an orthokeratologic contact lens.

FIG. 2 refers to an illustration of the curvatures utilized in an orthokeratology contact lens. The present invention includes a central base curve 12 and is shown with a line segment that is referred to as the lens' central axis 30. This central axis 30 begins at the apex 32 of the central base curve 12 and terminates at point 34 and serves as a reference point for the center of the contact lens 10. The line segment that is bounded by points 32 and 34 defines the radius of curvature 33 associated with the central base curve 12. Orthokeratology contact lenses use a flatter central base curve than that of the patient's cornea. Using conventional manufacturing processes with the curvatures of these zones being coaxial, the first annular zone must have a radius of curvature less than that of the central base curve 12 in order to bring the central base curve surface of the orthokeratology contact lens back toward the surface of the cornea. This fact is illustrated by the radius of curvature defined by the straight line distance between points 38 and the apex 40 of reverse zone curve 42 which is less than the radius of curvature 33 of central base curve 12. The typical reverse curve geometry is confined to designing lenses that use curves for the first annular or reverse zone 14 that have their origin of curvature located on the central axis 30 of the central base curve 12. Such a constraint is not placed on the lens design according to the present invention. Thus, the first annular zone 14 may be embodied by a first annular curve 44 that does not have its origin of curvature located on the central axis 30 of the central base curve 12 but instead origin 46 may lie on axis 47. In addition, the radius of curvature of this off-axis reverse zone curve 44 can have a radius of curvature that is greater than the radius of curvature of central base curve 12.

Furthermore, the central base curve 12, and first annular curve 44 which is comprised of a larger radius of curvature than that of central base curve 12, can be connected together at the same point in space 48 as would a central base curve 12 in the typical reverse geometry lens, with the first annular curve 42 having a smaller radius of curvature than the central curve 12. The lens design according to the invention provides enhanced flexibility and offers the opportunity to expand the overall effectiveness of using contact lenses to treat and correct vision.

What is claimed is:

1. A corneal contact lens comprising:
   a lens body having anterior and posterior surfaces, wherein the posterior surface is designed to alter the shape of the cornea of a wearer, and comprises a central curve having at least a first curvature, and a central curve axis; and
   at least a first annular curve located around said central curve, said first annular curve having a second curvature, and an annular curve axis, wherein the axis of said central curve is distinct from the axis of said annular curve.

2. A corneal contact lens comprising:
   a lens body having anterior and posterior surfaces, wherein the posterior surface is designed to alter the shape of the cornea of a wearer, and comprises a central zone having at least a first curvature, and at least one first annular zone located around said central zone, said first annular zone having at least a second curvature, wherein said second curvature is not coaxial with said first curvature.

3. The contact lens according to claim 2, wherein said first annular zone is adjacent the central zone and the second curvature of said first annular zone is flatter than said first curvature of said central zone.

4. The contact lens according to claim 2, further comprising at least one second annular zone located around said first annular zone.

5. The contact lens according to claim 2, wherein said central zone has a radius of curvature and said first annular zone has a radius of curvature, wherein said central zone radius of curvature is greater than said first annular zone radius of curvature.

6. The contact lens according to claim 4, wherein the central zone and the second annular zone each are defined at least in part by a radius of curvature, wherein the radius of curvature of the second annular zone is equal to or greater than the radius of curvature of the central zone.

7. The contact lens as recited in claim 2, wherein the central zone comprises a curvature selected from the group consisting of spherical, aspherical, toric, combined spherical and aspherical curves or combinations thereof.

8. The contact lens as recited in claim 2, wherein the first annular zone comprises a curvature selected from the group consisting of spherical, aspherical, toric, combined spherical and aspherical curves or combinations thereof.

9. The contact lens as recited in claim 2, wherein the at least first annular zone is comprised of a combination of a plurality of zones.

10. The contact lens as recited in claim 9, wherein the plurality of zones comprise multiple annular zones.

11. The contact lens according to claim 2, further comprising at least one peripheral zone located around said at least one first annular zone.

12. The contact lens as recited in claim 11, wherein an axis of the curvature of the at least one peripheral zone is not coaxial with an axis of the curvature of the central zone and/or an axis of the curvature of the at least one first annular zone.

13. The contact lens as recited in claim 11, wherein the central zone and the peripheral zone are defined at least in part by a radius of curvature, and the radius of curvature of the peripheral zone is greater than the radius of curvature of the central zone.

14. The contact lens as recited in claim 2, wherein each zone is made of different lens material.

15. The contact lens as recited in claim 2, wherein the contact lens may be machined from a single piece of plastic.

16. The contact lens as recited in claim 2, wherein a thickness of the central zone and at least the first annular zone are not consistent.

17. A method for designing a contact lens comprising the steps of:
   obtaining information relating to the characteristics of a person's eye,
   providing a lens body having a posterior and anterior surface, wherein the posterior surface is designed for reshaping the cornea of the person's eye by selecting a first curvature for a central zone of a contact lens based on the characteristics;
   selecting a third curvature for a peripheral zone of the contact lens based on the characteristics and requirements for reshaping the cornea;
   selecting a second curvature for independently connecting the curvature of the first and third curvatures, whereby the second curvature is flatter than the first curvature, and where the axis of the curvature of at least one of the first, second, and third curvatures are not coaxial with one another; and
   fitting the lens to the person.

* * * * *

UNITED STATES PATENT AND TRADEMARK OFFICE
CERTIFICATE OF CORRECTION

PATENT NO.     : 7,004,584 B1                                    Page 1 of 1
DATED          : February 28, 2006
INVENTOR(S)    : William E. Meyers and Jerome A. Legerton It is certified that error appears in the above-identified patent and that said Letters Patent is hereby corrected as shown below:

Column 6,
Line 38, delete "eve" and insert -- eye --.

Signed and Sealed this

Sixteenth Day of May, 2006

JON W. DUDAS
*Director of the United States Patent and Trademark Office*